April 22, 1969 L. J. FRENCH 3,440,620
ELECTRO-OPTICAL MEMORY
Filed Jan. 10, 1966
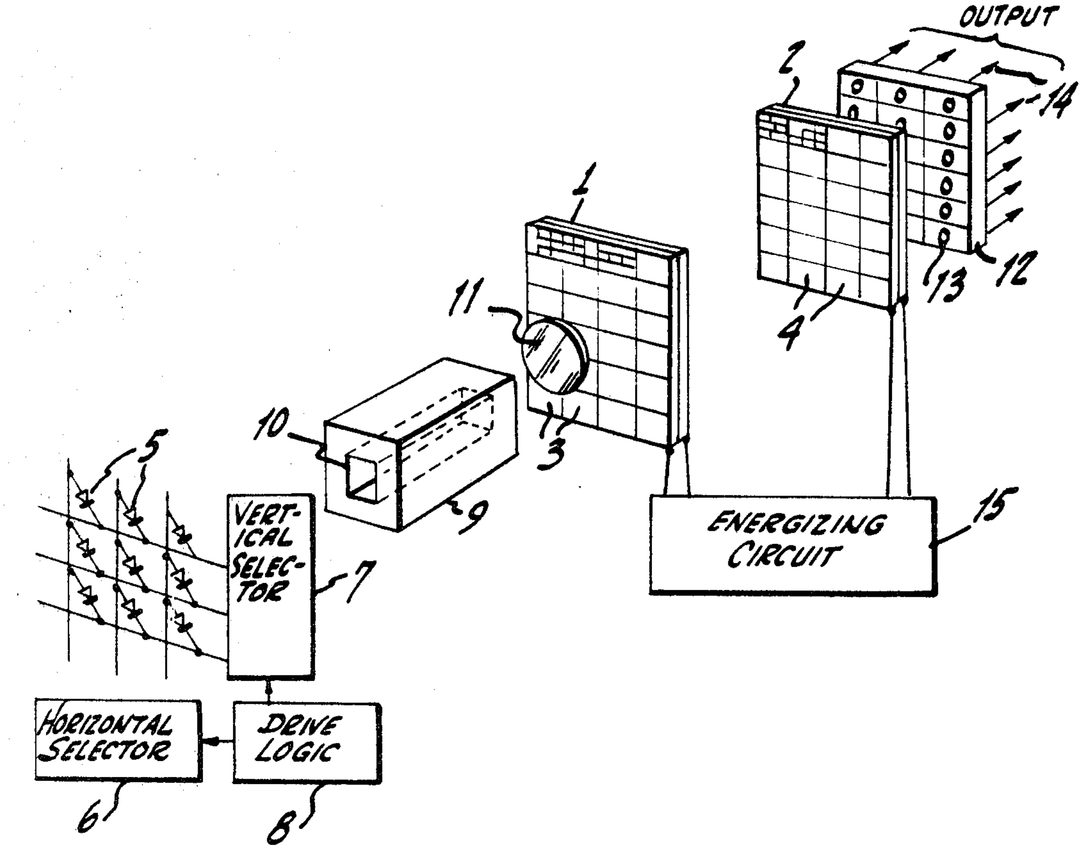
INVENTOR.
LARRY J. FRENCH
BY John V. Regan
Attorney

United States Patent Office 3,440,620

Patented Apr. 22, 1969

3,440,620

ELECTRO-OPTICAL MEMORY

Larry J. French, East Brunswick, N.J., assignor to Radio Corporation of America, a corporation of Delaware Filed Jan. 10, 1966, Ser. No. 519,615

Int. Cl. G11b *11/10*

U.S. Cl. 340—173 4 Claims

This invention relates to data memories. More specifically, the present invention relates to random-access memories.

An object of the present invention is to provide an improved high speed random-access memory.

Another object of the present invention is to provide an improved high speed optical memory having a rapid electronic access operation for stored information.

A further object of the present invention is to provide an improved high capacity optical memory having a solid state construction.

Still another object of the present invention is to provide optical memory having a simple operation and construction.

In accordance with the present invention, an optical memory comprises a matrix of selectively energizable discrete electromagnetic radiation producing elements and means to produce a plurality of images of the array. These images are directed onto corresponding storage cells of a stacked plurality of memory plates wherein the stored information is represented by incremental selectively transparent and opaque areas. The storage plate is made opaque to the radiation from the element by an externally applied field except in preselected incremental areas which are retained in a transparent condition. An individual sensing device for each of the cells aligned in the stack is arranged to provide an output signal representative of radiation passing through the cell area.

A better understanding of the present invention may be had when the following detailed description is read in connection with the accompanying drawing, in which the single figure is a pictorial representation of an optical memory embodying the present invention.

Referring to the single figure in more detail, there is shown an optical memory comprising a plurality of photographic storage plates 1 and 2. These plates are each subdivided into sub-areas hereinafter referred to as cells 3, 4 of the plates 1 and 2, respectively.

The storage plates 1, 2 may be any suitable devices which may be selectively made opaque to incident radiation by the application of an external control signal. Such a device is shown in the copending application George H. Heilmeier, Ser. No. 450,949, filed on Apr. 26, 1965. As shown therein, the operation of the device is achieved by the molecular orientation of a nematic liquid crystal such as p-n butoxy benzoic acid between 147 and 163 degrees centigrade. A "guest" material, such as aluminum flakes or a pleochroic dye such as methy-red or indolphenol-blue is mixed with the nematic "host" and is orientated therewith by the externally applied field. The nematic liquid crystal and the guest material may be arranged as a thin film between two transparent electrically conducting electrodes, e.g. glass sheets with tin deposited electrodes. In the event that the nematic crystal does not exhibit its nematic properties at ambient temperature, a heating element may be provided to heat the crystal to the desired temperature.

The incremental areas of the storage plates which are to remain transparent during the presence of the applied external field are free from the nematic crystal and the "guest" substance. Such areas may be provided by elevating these areas over the storage plate electrode surface having the liquid crystal coating or by drilling holes through the storage plates. Since the nematic crystal is in thin film form, it will be held between the plates without loss through the drilled holes. Another form which the storage plates 1 and 2 may take is a photographic plate with one of the electrode coatings forming the photographic representation of the stored data. The transparent areas, accordingly, would be provided by an omitted section of the photographically deposited electrode. The other electrode, of course, would be uniform since it would affect the liquid crystal only in the area between the two existing electrode surfaces.

Each cell 3, 4, in turn, is subdivided into incremental areas for storing binary information as either opaque marks 16 for storing one kind of data 17 or transparent marks for storing another kind of data. Thus, the plate 1 has a number of cells 3, 4 with each cell being divided into the same number of incremental areas. The number of areas in each cell is determined by the number of individual illuminating means for each cell. In the embodiment shown in the drawing, the illuminating means comprises an array of photo-emissive elements, such as GaAs (gallium arsenide) diodes 5 which produce electromagnetic radiation at the p-n junction in response to an applied current. The frequency of this radiation is dependent on several factors including the temperature of the environment. These diodes 5 are arranged across the intersections of a matrix having independently scanned X and Y connecting wires. A horizontal selection means 6 is used to selectively energize a desired X wire while a vertical selection means 7 is used to select a Y wire. A diode 5 at the intersection of the selected wires is energized and a beam of radiation is emitted therefrom. A suitable drive logic 8 is used to operate the selection means 6 and 7 to select a desired diode 5.

The radiation from the selected diode 5 is directed into an optical tunnel 9. The optical tunnel 9 may be a device as shown and described in Patent No. 3,191,157 of Parker et al. which issued on June 22, 1965. Briefly, this device comprises four blocks of optical glass, as shown, placed together to form a central longitudinal "tunnel" 10. The inside surfaces of the tunnel are arranged to form internal reflecting mirror surfaces by suitably coating the walls with a reflecting material, e.g. aluminum.

The light beam from the selected diode 5 is admitted into one end of the tunnel 10 while the other end of the tunnel 10 is arranged adjacent to a focusing lens 11. The lens 11 is effective to focus the images of the diode array 5 onto the memory plates 1, 2. A light sensitive matrix 12 comprising a plurality of photo-detectors 13 equal in number to the number of sub-areas 2 on the plate 1 is positioned behind the plates 1, 2. The photodetectors 13 are connected to individual output lines 14 to provide a parallel output representative of the information read out from the memory plates 1, 2. An energizing circuit 15 is provided to selectively energize the electrodes of the storage plate which is to be read.

In operation, the optical tunnel 9 is effective to provide a plurality of images of the array of diodes 5 in an image plane. Since each image comprises a reproduction of the entire array, these images are each focused by the lens 11 onto corresponding cells 3, 4. The individual diodes 5 are, thus, arranged to illuminate identical respective incremental areas in each of the cells 3, 4. The photocells 13 are each arranged to view an entire corresponding one of the cells 3, 4. Accordingly. any energy reaching a photocell 13 through a transparent incremental area in the corresponding one of the cells 2, 3 is converted to an output signal on a corresponding one of the output lines 14. The diodes 5 are selected by the horizontal and vertical selection means 6 and 7 to provide an energy beam at a particular location in the array. This beam is, then, distributed by the optical tunnel 9 and the lens 11 onto a corresponding incremental area in all of the cells 3, 4. Each cell that has a transparent incremental area at that location is represented by an output signal from the corresponding one of the photocells 13. The combined output from the sensing matrix 12 is a representation of the stored information on the memory plates 1, 2 at the incremental area selected by the diodes 5.

The memory plate that is to be read is selected by the energizing means 15. This selection is effective to render the selected plate opaque to the incident radiation except in the transparent incremental area. This opacity may be evidenced by either an interference with the radiation path in the case of "guest" aluminum particles or a selective color filtering by a dye "guest" which is made to cooperate with the substantially monchromatic radiation from the diodes 5. In either case, only the transparent areas transmit the radiation to the photocells 13. Of course, the unenergized storage plates are entirely transparent and do not enter into the data reading of the selected plate. While, for purposes of illustration, the array of diodes 5 has been shown as a 3 x 3 array, this may be expanded to a number dependent on the optical resolution of the system and the physical dimensions of the diodes 5 or other suitable energy sources, e.g. an array of 60 x 60 has been found to be practical with available diode element packing technique. The number of diodes, of course, is determinative of the number of incremental areas in each of the cells 3, 4. However, the number of cells 3, 4 is determined only by the number of usable images provided by the light tunnel 9. In other words, the image must supply enough radiation to produce an output signal from the photocells 13. Thus, the memory plate 1 illustrated has a 4 x 4 matrix, but it has been found that the usable images would allow, at least, an economical expansion to a 20 x 20 matrix. The further physical consideration is the reduction in radiation energy level in passing through the energized and unenergized storage plates. This may be conveniently limited to any arbitrary number, e.g. 10 storage plates, depending on the ability of the information signal to be extracted from the photocells 13.

What is claimed is:

1. An optical memory comprising a matrix of selectively energizable radiation producing devices, means operative to form a plurality of separate images of said matrix in a predetermined plane, information storage means comprising a plurality of storage cells arranged in a matrix, each of said cells having preselected incremental storage areas arranged to be transparent at all times to said radiation, said storage cells being operative under the influence of an applied field to provide an opaque condition to said radiation in the areas outside of said preselected areas, energizing means arranged to selectively apply said field to said storage cells and sensing means operative to provide separate output signals for each of said storage cells indicative of said radiation passing therethrough.

2. An optical memory as set forth in claim 1 wherein said storage cells are arranged in stacked matrices with corresponding ones of said cells in each matrix being axially aligned to allow said radiation to pass therethrough and said energizing means includes means for separately and selectively applying said field to one matrix of said storage cells.

3. An optical memory as set forth in claim 2 wherein said energizing means is arranged to apply said field to one matrix at a time.

4. An optical memory as set forth in claim 3 wherein each of said matrices comprises a pair of transparent electrically conductive electrodes having a nematic liquid crystal disposed therebetween with a "guest" material in suspension therein to be aligned with said nematic liquid crystal by said field.

References Cited

UNITED STATES PATENTS 3,248,552 4/1966 Bryan.

TERRELL W. FEARS, *Primary Examiner.*

U.S. Cl. X.R.

88—1